Sept. 5, 1944. G. A. CARLSON Re. 22,539
POLISHING AND BUFFING MACHINE
Original Filed June 30, 1938 2 Sheets-Sheet 1
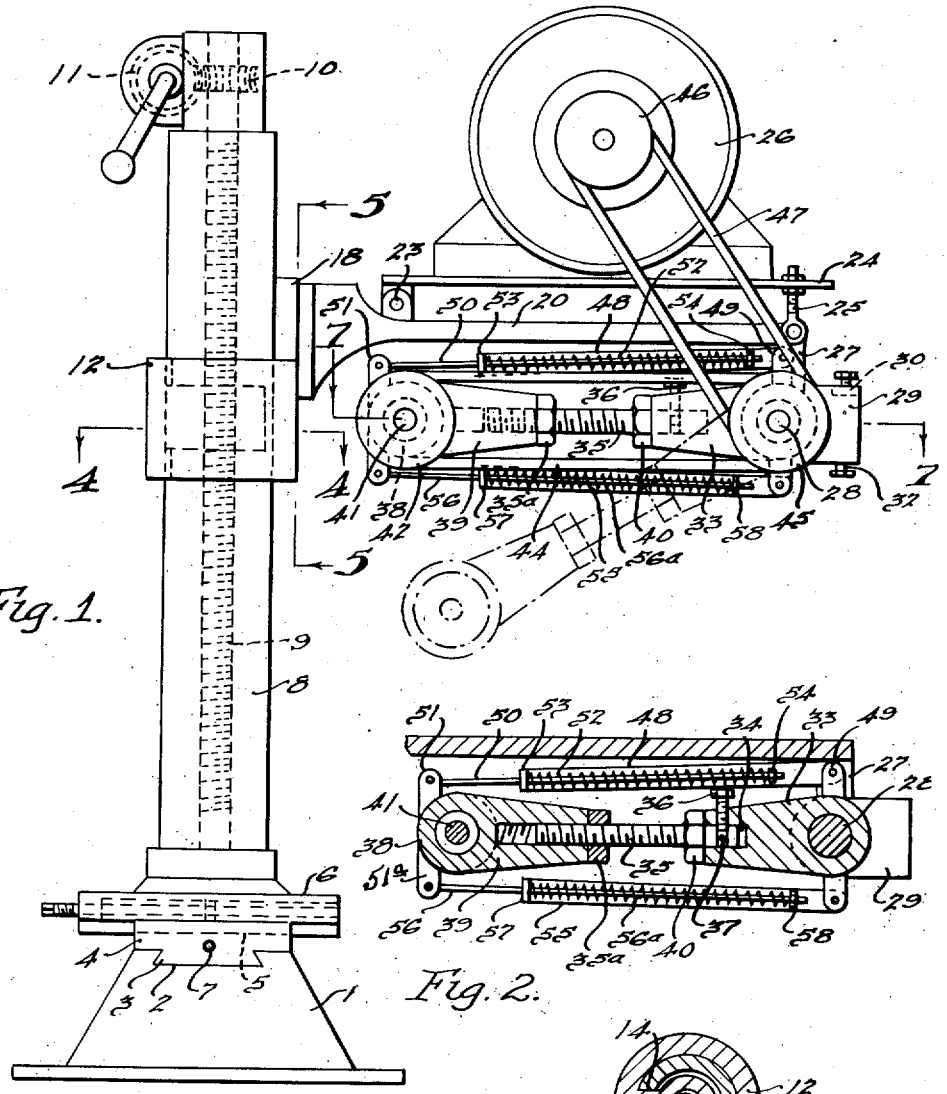
Fig. 1.
Fig. 2.
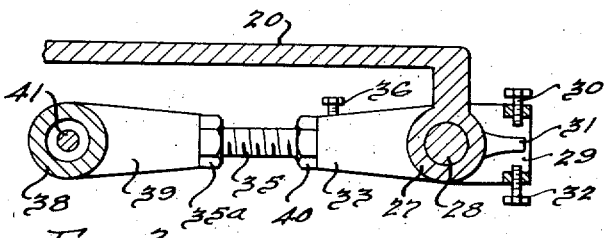
Fig. 3.
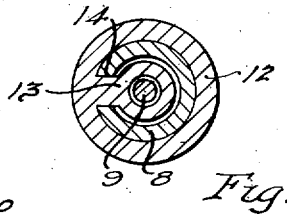
Fig. 4.
INVENTOR.
Gustave A. Carlson.
BY Joseph Farley
ATTORNEY.

Sept. 5, 1944. G. A. CARLSON Re. 22,539

POLISHING AND BUFFING MACHINE

Original Filed June 30, 1938 2 Sheets-Sheet 2

INVENTOR.
Gustave A. Carlson.
BY
Joseph Darley
ATTORNEY.

Reissued Sept. 5, 1944

Re. 22,539

UNITED STATES PATENT OFFICE 22,539

POLISHING AND BUFFING MACHINE

Gustave A. Carlson, Detroit, Mich.

Original No. 2,203,488, dated June 4, 1940, Serial No. 216,696, June 30, 1938. Application for reissue May 14, 1943, Serial No. 487,040

9 Claims. (Cl. 51—166)

This invention relates to polishing and buffing machines and has for its primary object to provide a machine for grinding, polishing or buffing objects in production, as said objects are fed thereto by conveying apparatus.

Another object is to provide a polishing and buffing machine including a rotary tool of substantial weight of improved sensitiveness for following irregular surfaces of the objects being worked upon, while maintaining a uniform working pressure on the work objects during such shifting. In this connection, the tool carrying spindle is supported upon the free end of a pivoted arm, and counterbalancing means acts upon said arm whereby the pressure of the tool on the work remains substantially uniform during pivoting of the arm.

Another object is to provide a machine embodying a shiftable support for a tool spindle, counterbalanced as above referred to, and means for supporting the tool spindle support, the counterbalancing means and the motor for driving the spindle whereby the entire unit may be adjusted horizontally, vertically and also angularly with respect to the horizontal. Such adjustments enable use of the same polishing and buffing unit with different types of work conveyors, and enables adjustment to accommodate the machine to work objects of widely varying shapes.

In prior machines of this character shifting of the tool spindle is usually accompanied with shifting of the spindle operating motor, with the result that shifting movements are sluggish due to the comparatively great weight being moved. This, of course, requires slower movement of the work objects as they are continuously fed to and past the machine. It is an object of this invention to support the operating motor whereby the spindle supporting arm is free from the weight thereof, and to thereby reduce the inertia whereby the wheel responds to the contour of more rapidly moving work.

It is also to be noted that prior machines of this character are usually constructed with the wheel spindle and motor out of balance with respect to their pivotal mounting, in order that gravity acting thereon supplies the necessary pressure between the wheel and the work. This also results in sluggish movement and has a further disadvantage in that as the mass shifts with respect to its pivot the pressure of the wheel on the work piece varies. Accordingly it is an object of this invention to provide means for counterbalancing the spindle support and adjustable means for regulating the pressure of the wheel on the work object. In other words, the spindle is not dependent upon the effects of gravity, and the pressure of the wheel on the work is definitely regulated and maintained proper for any given operation.

Other objects relates to the desirable features of construction of the machine whereby, for example, the several adjustments necessary to accommodate different work objects may be readily made, the manner in which the motor is mounted and operatively connected to the tool spindle, and the means for maintaining the motor and spindle belts tightened.

In the accompanying drawings

Fig. 1 is a side elevation of the machine;

Figs. 2 and 3 are vertical sections illustrating details;

Fig. 4 is a section taken on the line 4—4 of Fig. 1;

Figure 5:
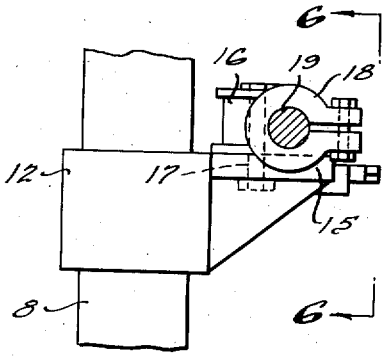
Fig. 5 is a section taken on the line 5—5 of Fig. 1.

The present machine includes a base 1 having a dove-tail guide 2 slidably receiving a dovetailed end 3 of block 4. In the upper portion of the block 4 is provided a dovetail 5, disposed at right angles to the guide 2, and slidably receiving a plate 6. The plate 6 and the block 4 have screws 7, such as are usually employed in this type of sliding arrangement, for causing relative movement of the elements for adjustment purposes.

Supported by the plate 6 is a vertical tubular post 8 having a screw 9 therein with a worm gear 10 adapted to be rotated by the manually operable worm gear 11. A slide member 12 is mounted upon the post 8, and has a portion 13 extending through a slot 14 in the post and screw threadedly engaging the screw 9. Engagement of the portion 13 with the sides of the slot 14 prevents rotation of the slidable element relative to the post, and engagement with the screw 9 results in vertical sliding movement of the element 12 upon manual rotation of the screw 9.

The sliding element 12 has a projecting bracket 15 upon which is secured a fixture 16 (Fig. 5), the fixture being secured by means of a substantially centrally disposed pin 17 which may be tightened to hold the fixture against movement when once placed in the desired location. The fixture 16 includes a clamping element 18 which receives a stud 19 for supporting a table 20 (Fig. 6), the stud having a worm gear 21 adapted to be rotated, when the clamping elements 18 are loose, by a manually operable worm 22. The table 20 is here illustrated as being horizontally disposed, but obviously it may be tilted, by the above described means, about the axis of the stud 19. When once placed in the desired location, however, the clamping elements 18 are tightened to hold the stud against accidental movement.

Supported at one end by pivot brackets 23, on the table 20, is a motor support 24, the free end of which is connected to the table 20 by an adjustable element 25, in order that it may be elevated or lowered for belt tightening purposes as will hereinafter appear. An electric motor 26 is mounted on the member 24.

Depending from the table 20 is a bracket 27 supporting a transverse shaft 28, and rotatable upon the said shaft 28 is a bracket having two aligned bearing portions 29 in which said shaft is received, said bearings being united by a pair of transverse webs 30 formed integral with said bearing portions 29. As may be seen in Fig. 3, the bracket 27 has a projecting element 31 extending between the webs 30 and adapted to engage a pair of set screws 32 mounted in the webs 30 and which set screws may be adjusted to limit the amount of rotation of the bearing members.

Each bearing member 29 has a socket 33 extending radially relative to the shaft 28 and in which is received a pilot 34 formed on one end of a screw 35. The pilot of each screw is retained in its respective socket 33 by engagement of a set screw 36 engaging within an annular groove 37 formed in each pilot. Carried by the other end of said screws 35 is a spindle support 38 having a pair of internally threaded sockets 39 in which the ends of the screws 35 are threaded. The screws are formed with means such as the hex-shaped transversely spaced tool receiving portions 40 whereby they may be manually rotated to vary the distance between the shaft 28 and the spindle support and are provided with lock nuts 35—*a* to engage the sockets 39. Rotatable in the spindle support is a spindle 41 having a pulley 42 on one end, and a polishing and buffing wheel 43 on the other end.

The shaft 28, bearings 29, sockets 33 and 39, being connected by the screws 35 form a swinging arm, supporting the spindle 41 for swinging movement about the axis of the shaft 28. The pulley 42 is connected by belts 44 to a four groove pulley 45 which is loosely journalled on shaft 28, and inasmuch as the spindle swings about the axis of said shaft 28, the distance between the two pulleys 42 and 45 remains constant. Proper tension may be placed on the belts 44 by adjusting the screws 35 in their sockets 39. The motor 26 has a pulley 46 connected to the pulley 45 by belts 47, and the belts 47 may be properly tensioned by adjusting the screw 25 by which one end of the motor support 24 may be depressed or elevated.

Figure 6:
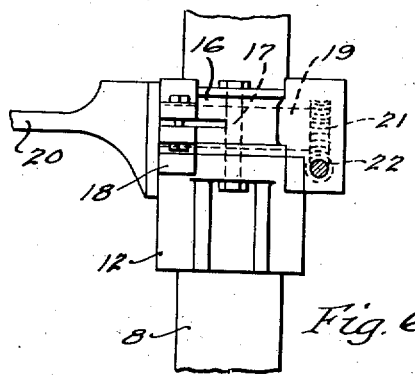
Fig. 6 is a section taken on the line 6—6 of Fig. 5.
Figure 9:
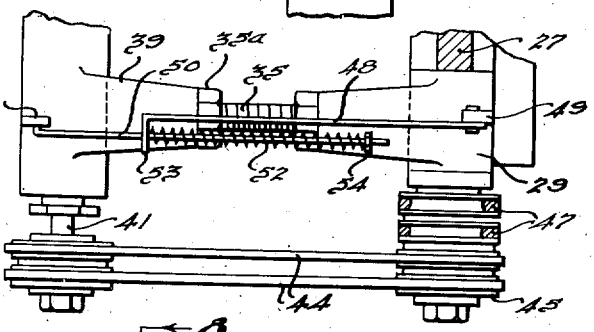
Fig.9 is a fragmental plan of a detail.
Figure 7:
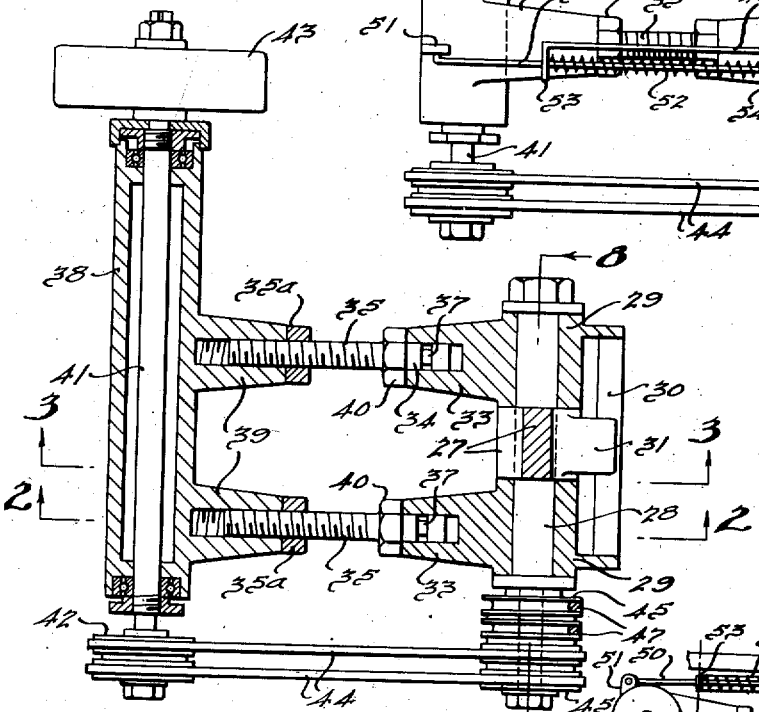
Fig. 7 is a section taken on the line 7—7 of Fig. 1.
Figure 8:
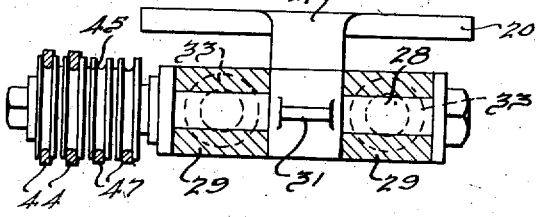
Fig. 8 is a section taken on the line 8—8 of Fig. 7.

As it is desirable to have the buffing wheel 43 held against the work piece to be buffed with a certain pre-determined pressure and as the machine is designed for buffing work pieces having varying contours, a spring counterbalance of special design is employed for the swinging arm which consists of the various parts shown in Figs. 6 and 7 of the drawings. This spring counterbalance consists of a pair of similar devices, one mounted above the axis of the trunnions 28 and the other mounted below the said trunnions.

As shown in the drawings, the upper spring counterbalancing means consists of a yoke strap 48, one end of which is pivotally attached to a lug 49 made integral with the bracket 27 depending from the table 20. The other end of the yoke strap 48 is bent laterally to form an eye 53 through which a rod 50 passes slideably, one end of the rod 50 being bent laterally for engagement with an apertured ear 51 formed integrally with and projecting upwardly from the spindle support 38. At its other end rod 50 is screw-threaded to receive an adjustable nut 54, a spring 52 being sleeved on the rod 50 and interposed between the eye 53 of the yoke strap 48 and said adjustable nut 54. A similar yoke strap 55 has one end pivotally connected to a fixed lug 49—*a* similar to the lug 49 and has its other end bent laterally to provide an apertured eye 57 through which a rod 56 extends slideably. One end of the rod 56 is connected to a depending ear 51—*a* formed integrally with the spindle support 38, and the rod 56 also has sleeved upon it a spring 56—*a* which is confined between the eye 57 of the yoke strap 55 and an adjustable nut 58. By suitably adjusting the nuts 54 and 58 the buffing wheel can be caused to press against a work piece to be buffed with any desired pressure. When the nut 54 is tightened the spring 52 obviously will exert pressure on the nut 54 thereby tending to pull the rod 50 towards the right, as shown in the drawings, thus tending to elevate the spindle support 38 and to counterbalance the weight of the parts which comprise the swinging arm, which, were it not for the presence of the spring counterbalancing means 52, would tend to rotate or drop downwardly about the trunnions 28. By tightening the nut 58 for the lower spring counterbalancing means, the pressure of the spring 56—*a* will tend to move the rod 56 also towards the right end of the drawing, thus exerting a downward pull upon the spindle support 38.

Figure 10:
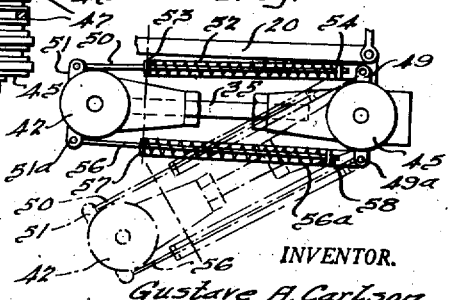
Fig. 10 is a somewhat diagrammatic view in side elevation illustrating the action of the oscillating spindle support.

It will be noted that as the pivotal connections of the spring assemblies which carry the springs 52 and 56—*a* are preferably located at the points 49 and 49—*a* in substantial alignment with the axis of the trunnions 28 about which the swinging arm is adapted to rotate, and as the parts 49 and 49—*a* remain stationary, although a considerable amplitude of linear movement of the spindle support 38 and buffing wheel 43 may occur, only a relatively small amount of sliding movement of the eyes 53 and 57 along the rods 50 and 56 will take place. This action may be best understood by reference to the showing of Fig. 10 where a dot and dash line has been drawn through the eyes 53 and 57 to illustrate what may be termed their initial position when, as shown in the full line position of this figure, the swinging arm is in substantially a horizontal position. In the dotted line position of the parts, however, wherein the swinging arm has been moved downwardly, the dot and dash line being shown in the same position as in the full line showing, it will be seen that the eye 53 has moved along the rod 50 towards the right of the dot and dash line whereas the rod 56 has been moved towards the left of the dot and dash line an equal amount. By measuring the amount of linear movement of the axis of the swinging support 38, as indicated in Fig. 10, and by measuring the extent of movement of the eyes 53 and 57 respectively from the dot and dash line, it will be seen that the movement of the eyes along their respective rods 50 and 56 is only a small fractional part of the linear movement of the spindle support and that obviously the amount of alteration of the length of the springs as the swinging arm oscillates will bear the same relation to the linear travel of said spindle as the distance from one of said supports to said fixed axis bears to the distance from the latter to said spindle support. It will also be apparent that for smaller movements of the swinging arm than indicated in Fig. 10, the movement of the eyes 53 and 57 along their respective rods 50 and 56 will be very small and therefore the variation in pressure exerted by the respective springs 52 and 56—*a* will be practically negligible.

It will thus be seen that when the nuts 54 and 58 have been adjusted to cause the buffing wheel to be pressed against a work piece with a certain pre-determined pressure, the buffing wheel may follow rather deep contours in the work piece and will at all times be held with substantially the same pressure against the work piece.

Most counterbalancing spring constructions as heretofore employed, have, as far as I am aware, been of the type where the spring is connected directly in the vertical line of movement of the part to be counterbalanced and so that the linear movement imparted to the spring is substantially equal to the linear movement of the part to be counterbalanced, and as a result, the spring reactions are greatly increased for any appreciable movement of the counterbalanced part, whereas with the present invention but very slight distortion of the springs occurs for a wide range of movement of the swinging arm. For example, if the movement of the springs 52 and 56—*a* were directly connected in a vertical line above or below the spindle support 38, the extent of movement shown in Fig. 10 could not possibly take place as the lower spring would be fully compressed long before the swinging arm could reach the dotted line position whereas the upper spring would be stretched such an extent as to exceed the elastic limit thereof.

While I have shown a constructional example that has proved highly satisfactory in commercial operation, it will of course be understood that many changes, variations and modifications of the details of the particular construction described and illustrated may be resorted to without departing from the spirit of the claims hereunto appended.

I claim:

1. The combination of an arm mounted for oscillation about a fixed axis, a tool holding spindle mounted in said arm parallel to said axis, a pulley having a plurality of grooves concentric with said axis, a stationary motor support having a motor mounted thereon, means driving said pulley from said motor, means driving said spindle from said pulley, springing means supporting said arm against gravity at an angle with respect to the vertical, and springing means including the first named springing means opposing oscillation of said arm out of its selected position and means for individually adjusting the resistance of said springing means.

2. The combination of an arm mounted for oscillation about a fixed axis and having a tool holding spindle mounted for rotation therein, spring means positioning said arm against gravity, a stationary motor support having a motor thereon for driving said spindle, said arm being composed of a plurality of telescoping parts adjustable in length to vary the radius of oscillation thereof, and removable means connecting some of said parts, said last named means being removable to enable complete separation of the parts it connects while other of said parts are moved telescopically.

3. The combination of an arm mounted for oscillation about a fixed axis, a tool holding spindle mounted in said arm parallel to said axis, spring means extending substantially parallel to said arm and located at one side of said axis and normally urging said arm in one direction about said axis and spring means also extending substantially parallel to said arm and located on the other side of said axis for opposing the action of said first named spring means.

4. The combination of an arm mounted for oscillation about a fixed axis, a tool holding spindle mounted in said arm parallel to said axis, and means for urging said tool holding spindle with a pre-determined pressure toward a work piece comprising a pair of coiled springs, a reaction support for one end of each of said springs pivotally connected to a stationary support located substantially in the same plane as the said fixed axis and an adjustable reaction support for the other end of each of said springs pivotally connected to said spindle at a point spaced laterally from the longitudinal axis of said arm.

5. The combination of an arm mounted for oscillation about a fixed axis, a tool holding spindle mounted in said arm parallel to said axis, and means for urging said tool holding spindle with a pre-determined pressure toward a work piece comprising a pair of coiled springs, located one on each side of said arm, a yoke strap for each of said springs having one end thereof pivotally connected to a stationary support located substantially in the plane of said fixed axis and spaced laterally therefrom, said strap having an apertured ear at the other end thereof forming a reaction support for one end of its respective spring, a rod mounted for slidable movement through said eye, having an adjustable nut on one end thereof against which the other end of said spring abuts, and means for connecting the other end of said rod to said spindle at a point spaced laterally from the axis thereof.

6. The combination of a swinging arm mounted at one end for oscillation about a fixed axis, a tool holding spindle mounted in the free other end of said arm parallel to said axis, a pair of opposed spring means, one for urging said arm in one direction and the other for urging said arm in an opposite direction about said axis, fixed supports for said spring means located substantially in the plane of said fixed axis and laterally spaced therefrom and supports for the other end of said spring means fixed to said tool spindle whereby the ends of said spring means fixed to said spindle will rotate in arcs having their centers on said fixed axis and will produce a shortening and lengthening of the respective spring means of much smaller linear dimension than the amount of linear movement of said tool holding spindle.

7. The combination of a swinging arm mounted at one end for oscillation about a fixed axis, a tool holding spindle mounted in the free other end of said arm parallel to said axis, a pair of spring devices, one for urging said arm in one direction about said fixed axis and the other for urging said arm in an opposite direction, means for adjusting the length of said springs to cause said tool holding spindle to be urged with a predetermined pressure towards the work piece and means for anchoring one end of each of said spring means to said tool holding spindle to rotate with said arm about said fixed axis and means for anchoring the other end of each of said spring means to a fixed support located substantially in the plane of said fixed axis and laterally spaced therefrom a distance much smaller than the distance between said fixed axis and said tool spindle whereby for any given extent of linear travel of said tool spindle as said arm oscillates about said fixed spindle a change of length of said springs of much smaller extent will occur and substantially proportional to the ratio which the distance between one of said fixed supports and said fixed axis bears to the distance between said fixed axis and the axis of said tool holding spindle.

8. The combination of a swinging arm mounted at one end for oscillation about a fixed axis, a tool holding spindle mounted in the free other end of said arm parallel to said axis, a pair of spring devices, one for urging said arm in one direction about said fixed axis and the other for urging said arm in an opposite direction, means for adjusting the length of said springs to cause said tool holding spindle to be urged with a predetermined pressure towards the work piece and means for connecting said spring means to said arm so that but a small amount of alteration of the length of said spring means, and consequently the reactance thereof, will occur for any given amount of linear travel of said tool holding spindle as said arm oscillates about said axis, which comprises anchoring one end of said spring means in fixed relation to said tool holding spindle to rotate therewith and anchoring the other end of each of said spring means to a fixed support located in the plane of said axis but spaced laterally therefrom a distance which is but a small fractional amount of the distance between said fixed axis and the axis of said tool holding spindle whereby the amount of alteration of the length of said spring means as said arm oscillates about said axis bear the same relation to the linear travel of said spindle as the distance between said fixed axis and one of said fixed supports bears to the distance between said fixed axis and the axis of said tool spindle.

9. The combination of a motor support, an arm pivoted at one end on said support and having a tool holding spindle rotatably mounted in the other end thereof, counterbalancing means for said arm, a motor on said support driving said spindle, said arm being formed of two parts having screwthreaded engagement enabling adjustment of the arm as to length and a third part connected to one of said parts by a removable means, a base on which said motor support is mounted, and means for adjusting said motor support vertically and rotationally with respect to said base.

GUSTAVE A. CARLSON.